United States Patent [19]

Lau et al.

[11] Patent Number: 4,904,415
[45] Date of Patent: Feb. 27, 1990

[54] OXIDE GLASSES HAVING LOW GLASS TRANSFORMATION TEMPERATURES

[75] Inventors: John W. Lau, Gaithersburg, Md.; Anastasia M. Conlon, Easton, Mass.

[73] Assignee: W. R. Grace & Co.-Conn., New York, N.Y.

[21] Appl. No.: 235,066

[22] Filed: Aug. 22, 1988

[51] Int. Cl.$^4$ .............................................. H01B 1/06
[52] U.S. Cl. .................................... 252/514; 252/512; 252/513; 501/19; 501/49; 106/1.12; 106/1.13; 106/1.14; 106/1.15
[58] Field of Search .................... 501/19, 49; 252/514, 252/512, 513; 106/1.13, 1.14, 1.15, 1.12

[56] References Cited

U.S. PATENT DOCUMENTS 3,711,328  1/1973  Wada et al. .
4,401,767  8/1983  Dietz et al. .
4,446,059  5/1984  Eustice .
4,636,254  1/1987  Husson, Jr. et al. .
4,699,888  10/1987  Dumesnil et al. .

OTHER PUBLICATIONS

Takamori, T., "Solder Glasses", chapter in Treatise on Materials Science and Technology, vol. 17, Glass II, Edit. M. Momozawa and R. H. Doremus, Academic Press (1979), pp. 173-255.

Owens, N. L., Microelectronic Manuf. and Test., Apr., 1986, pp. 6-7, at p. 7.

Primary Examiner—Josephine Barr
Attorney, Agent, or Firm—Edward J. Cabic

[57] ABSTRACT

$PbO-B_2O_3-Ag_2O$ glasses having a preferred weight ratio range of 76-88:10-15:2-10 have glass transition temperatures of less than 300° C. and are especially useful for adhering together ceramic substrates such as for attaching integrated circuits to ceramic substrates. The glasses can be formulated with Ag particulates and organics and applied as pastes to provide conductive adhesives.

15 Claims, No Drawings

OXIDE GLASSES HAVING LOW GLASS TRANSFORMATION TEMPERATURES

BACKGROUND OF THE INVENTION

1. Field of the Invention

This invention relates to adhesive glasses and more particularly to $PbO$-$B_2O_3$-$Ag_2O$ glasses with low glass transformation temperatures ($T_g$).

2. Description of the Previously Published Art

Current conductive die attach adhesives which are used for attaching integrated circuits to ceramic substrates are essentially a mixture of silver and glass powder in an organic vehicle. They require firing at temperatures in the range 420°–450° C. to achieve strong bonding so as to ensure reliability of the integrated circuit package assembly. The primary reason for requiring such firing temperatures is to achieve sufficient flow in the glass component of the adhesive to allow wetting of the integrated circuit chip and the ceramic substrate. These high firing temperatures can result in degradation of the integrated circuit chips and migration and oxidation of Ni on the metallization of the substrate. See, for example, Owens, N. L., *Microelectronic Manuf. and Test.*, April 1986, pp. 6–7, at p. 7, which reviews nickel migration during organic burn-off.

To lower the firing temperature and still achieve good bonding, glasses having lower glass transformation temperatures ($T_g$) or having more fluid properties at lower temperatures are required.

Most glasses used in conductive die-attach adhesives are $PbO$-$B_2O_3$ based glasses with various oxide additives such as $SiO_2$, $ZnO$, $Bi_2O_3$, and $BaO$. These glasses have a $T_g$ typically above 300° C. Alkali metal oxides ($Na_2O$, $K_2O$) and thallium oxide can be added to the glass melt to lower the $T_g$, but such oxide additions are known to result in glasses having poor resistance to moisture and, therefore, not acceptable as die-attach adhesives. See Takamori, T., "Solder Glasses", a chapter at pages 173–255 in *Treatise on Materials Science and Technology*, Vol. 17, Glass II, Edit. M. Momozawa and R. H. Doremus, Academic Press (1979).

Certain other oxides lower the $T_g$ of $PbO$-$B_2O_3$ glasses but are avoided for various reasons. CdO and BaO present additional toxicity problems; $Bi_2O_3$ attacks platinum crucibles conventionally used in preparing the melts. $PbO$-$B_2O_3$ based glasses will dissolve oxide crucibles such as silica, alumina, clay, porcelain, etc. It is therefore important to match the glass to the melt container and vice-versa.

To meet the stringent requirements for die attachment, aside from lower $T_g$ and considerations above mentioned, the glasses must also be resistant to crystallization during the firing step. This is because crystallization of the glass can lead to abrupt increases in viscosity and, hence, prevent flow and wetting of the integrated circuit and ceramic substrate.

Prior patents disclose various glass compositions, but they provide no suggestion of the low Tg $PbO$-$B_2O_3$-$Ag_2O$ glass composition which are found effective here for die attach adhesives.

U.S. Pat. No. 3,711,328, Wada et al. (1973), discloses a glass frit consisting essentially of 0.1–17 weight % $Ag_2O$ and 83–99.9% of a base composition consisting essentially of 60–80% $PbO$, 8–16% $B_2O_3$, 12–24% $ZnO$. The basic glass composition has $ZnO$ as a required component. In Example 12 of the patent, PbO is 64.7 weight %, $B_2O_3$ 11.6%, $ZnO$ 13.7%, $Al_2O_3$ 7.0%, and $Ag_2O$ 3.3%. It is used in making a resistor paste with no suggestion for use as an adhesive.

U.S. Pat. No. 4,401,765, Dietz et al. (1983), discloses a silver-filled lead borosilicate glass metallizing paste for bonding silicon dies to ceramic substrates. $Ag_2O$ is absent.

U.S. Pat. No. 4,446,059, Eustice (1984) discloses a conductive composition containing lead borosilicate, $Ag_2O$, and Ag powder for use as automotive window defoggers. Proportions of ingredients for such composition are stated in column 3 of the patent as (with respect to the instant invention), 60–98.5% Ag, 20–1% lead borosilicate, and 5–60% of a blend of $Ag_2O$ and $B_2O_3$ as a colorant. This is a physical mixture of the ingredients and does not disclose the homogenous compositionas set forth herein.

U.S. Pat. No. 4,636,254, Husson et al. (1987), discloses a silicon die attach paste consisting of a physical mixture of Ag flake 65.38 weight %, lead borate glass frit 17%, $Ag_2O$ 2.62%, balance organics to make 100%. The Ag flake is 50% 200 mesh, 50% 100 mesh. We differ from Husson, inter alia, in that our $Ag_2O$ is an integral component of our glass, whereas in Husson the $Ag_2O$ is in physical mixture.

U.S. Pat. No. 4,699,888, Dumesnil et al. (1987), discloses adhesive glass pastes containing 75–85 weight % Ag powder and a glass containing $PbO$, $B_2O_3$, $SiO_2$, $Cu_2O$, a metal fluoride, and optionally $ZnO$, $Bi_2O_3$. The materials were powdered, formulated as a paste, and used to bond silicon wafers to alumina substrates. $Ag_2O$ was not disclosed. The pastes were fired at 380° and 450° C.

OBJECTS OF THE INVENTION

It is an object of the invention to provide a die attach adhesive containing a glass characterized by a $T_g$ not higher than about 300° C., good wetting properties, containing components which are compatible with melting in platinum crucibles to maintain high purity, and resistant to moisture and to recrystallization of components.

Another object is to provide two-piece ceramic articles bonded with a low-$T_g$ $PbO$-$B_2O_3$-$Ag_2O$ glass.

A still further object is to adhere integrated circuit chips to a ceramic base without degrading the chip.

An additional object is to reduce formation of NiO on substrate metallization.

Further objects are to provide particulate sizes of glass and Ag to minimize cracking and voids in the adhesive.

These and further objects will become apparent as the description of the invention proceeds.

SUMMARY OF THE INVENTION $PbO$-$B_2O_3$-$Ag_2O$ glass having compositions with a respective weight ratio of 76–88:10–15:2–10 have glass transformation temperatures ($T_g$) of less than 300° C. and can be used as adhesives for adhering together two or more substrates such as for attaching integrated circuit chips to ceramic substrates. The lower fusion temperatures avoid damage to the circuits on the chips. Also, lower temperatures reduce NiO formation, which eliminates the need for hydrogen reduction prior to lid sealing an integrated circuit into the package. In a preferred embodiment the comminuted ("powderized") glasses can be mixed with silver particles to provide thermally and electrically conductive adhesives for such attachments.

When making the powdered glass and silver particle mixture, it has been found very effective to have the glass to Ag in a weight ratio of about 1:3–5.7 and to have the Ag particles in a mixture of two components A and B. Component A has Ag particles with an average size of about 9 microns and with about 90 weight % less than 15 microns and about 10% less than 4 microns. Component B has Ag particles with an average size of about 3.5 microns and with about 90 weight % less than 11 microns and about 10 weight % less than 0.7 micron. The weight ratio of components A:B preferably about 3–6:1.

Conductive adhesive pastes are made from the glass powders of this invention, conductive metal particulates (preferably Ag) and organic binder components including solvents.

DETAILED DESCRIPTION OF THE INVENTION

The preferred procedure for the preparation of PbO-$B_2O_3$-$Ag_2O$ glasses on a small scale in 25 gm batches involves mixing powders of PbO (76–88 wt. %), $B_2O_3$ (10–21 wt. %), and $Ag_2O$ (2–10 wt. %) and melting in platinum crucibles in an electrically heated furnace at 800° C. for about 15 minutes. The glasses are formed by quenching the melts to ambient temperature by pouring onto a steel platen. It was found preferable to add $Ag_2O$ in a different, non-oxide form such as $AgNO_3$ to form a homogeneous glass and to obtain the benefit of having a lower $T_g$. If $Ag_2O$ was used as such, the undesired reaction $$Ag_2O \rightarrow 2Ag + \tfrac{1}{2}O_2$$

occurs during heating of the powder mixture, leading to Ag particulate inclusions in the glass and no substantial lowering of $T_g$ since $Ag_2O$ is not incorporated into the structure of the glass. ap The $T_g$ of the glasses was determined by differential scanning calorimetry carried out at heating rate of 20° C./min in air. The results are shown in Table I. The glasses in all examples herein were prepared by the general procedure described above, using the amounts of ingredients as stated.

As can be seen in Table I, glasses in the PbO-$B_2O_3$-$Ag_2O$ system exhibit a very low $T_g$, particularly when $Ag_2O$ is substituted for PbO (while the $B_2O_3$ content remains constant), and when $Ag_2O$ is substituted for $B_2O_3$ (while the PbO content remains constant). The glasses of examples 12–14 have greater than 15% $B_2O_3$ and are not preferred glasses because the $T_g$ temperature is greater than 300° C.

TABLE I
Variation of $T_g$ with Composition of Glasses
Weight Percent

| Example No. | PbO | $B_2O_3$ | $Ag_2O$ | $T_g$ (°C.) |
|---|---|---|---|---|
| 1 | 90 | 10 | 0 | 281 |
| 2 | 88 | 10 | 2 | 266 |
| 3 | 85 | 10 | 5 | 254 |
| 4 | 80 | 10 | 10 | 250 |
| 5 | 88 | 12 | 0 | 293 |
| 6 | 85 | 12 | 3 | 284 |
| 7 | 82 | 12 | 6 | 264 |
| 8 | 80 | 12 | 8 | 260 |
| 9 | 85 | 15 | 0 | 320 |
| 10 | 80 | 15 | 5 | 293 |
| 11 | 76 | 15 | 9 | 283 |

TABLE I-continued
Variation of $T_g$ with Composition of Glasses
Weight Percent

| Example No. | PbO | $B_2O_3$ | $Ag_2O$ | $T_g$ (°C.) |
|---|---|---|---|---|
| 12 | 76 | 18 | 6 | 317 |
| 13 | 80 | 20 | 0 | 354 |
| 14 | 76 | 21 | 3 | 338 |

To illustrate further the effectiveness of $Ag_2O$ in PbO-$B_2O_3$ glasses, PbO-$B_2O_3$ mixtures having the same proportion of PbO and $B_2O_3$ as in the glass of Example No. 6, but where the $Ag_2O$ has been replaced with other additives were prepared in the same way and the $T_g$ determined. Results of the Comparison Examples 15–20, with various additives are given in Table II.

As can be seen from Tables I and II, the addition of $Ag_2O$ produced the lowest $T_g$.

TABLE II
Influence of Additives on PbO—$B_2O_3$ Glasses

| Example No. (a) | Additive | $T_g$ (°C.) |
|---|---|---|
| (The Invention) | | |
| 6 | $Ag_2O$ | 284 |
| (Comparison Example) | | |
| 15 | $SiO_2$ | 323 |
| 16 | $Al_2O_3$ | 314 |
| 17 | $Bi_2O_3$ | 301 |
| 18 | BaO | 298 |
| 19 | CdO | 300 |
| 20 | ZnO | 299 |

(a) All examples used 85 wt. % PbO, 12% $B_2O_3$, and 3% additive.

With a view of increasing resistance to crystallization, multicomponent glasses have been developed within the generic concept of the invention. It is expected that the addition of ZnO in an amount of up to 10 wt. % and the addition of $Al_2O_3$ in an amount of up to 2 wt. % in PbO-$B_2O_3$-$Ag_2O$ glass compositions can improve the resistance to crystallization. Examples are given in Table III. A preferred composition in Table III is shown in Example 23. That composition in particular has excellent stability towards devitrification, as indicated by the large temperature difference between $T_x$ and $T_g$. $T_x$ is the temperature where crystallization first appears.

The resistance to moisture was tested by powderizing the glass and placing it in a Parr bomb in water at 121° C. for 21 hours. The amount of extractable ions (in the water) from the glass of Example No. 23 was found to be much less than 25 ppm. See Table VI infra. This shows the composition had excellent resistance to moisture.

TABLE III
Composition of PbO—$B_2O_3$—$Ag_2O$-Based Glasses in Weight %

| Example | PbO | $B_2O_3$ | $Al_2O_3$ | ZnO | $Ag_2O$ | $T_g$(°C.) | $T_x$(°C.) (a) |
|---|---|---|---|---|---|---|---|
| 21 | 83.42 | 11.61 | | 1.64 | 3.33 | 279 | 398 |
| 22 | 83.78 | 11.66 | | 1.88 | 2.68 | 281 | 404 |
| 23 | 83.71 | 11.45 | 0.29 | 1.88 | 2.67 | 280 | 410 |

(a) $T_x$ is determined from differential scanning calorimetry and is defined as the temperature where cystallization first appears.

ADHESIVE PASTES

Adhesive pastes can be made using the glasses of this invention by comminuting the glasses such as the composition of Example No. 23 into a powder and optionally mixing with conductive particulates such as Ag followed by mixing with an organic binder conventionally used for this purpose. The glass comminution process can be done by conventional processes such as by ball milling. However, particular attention should be paid such that all the particles used for our invention pass through a 200-mesh screen and particles less than about 1-2 microns are not generated. In other words, if particles less than about 1-2 microns are generated, they should be discarded.

Glass particles finer than one or two microns will shrink excessively during the firing of the adhesive paste. This results in voiding underneath the die with consequently less heat dissipation from the device such as an integrated circuit. Excessive shrinkage also causes cracks to form in the adhesive around the perimeter of the die. These cracks reduce both die shear and die pull strengths.

A homogeneous blend of two types of silver particles is preferably used. The silver used in larger amount is of an average particle size of approximately 9 microns. Its preferred particle size distribution is relatively narrow, having approximately 90% less than 15 microns and about 10% less than 4 microns. These coarse particles provide a conductive skeleton which shrinks minimally during the firing of the adhesive. It allows the glass to flow readily through its interstices, which in turn supplies its high fired strength.

The silver used in the smaller amounts is of an average particle size of approximately 3.5 microns. Its particle size distribution ranges from about 90% less than 11 microns to about 10% less than 0.7 micron. The advantage to this material is that it fits into the conductive skeleton mentioned before, while providing accelerated sintering at the reduced firing temperature of this adhesive. This increases both the thermal and electrical conductivity of the adhesive as well as its ultimate strength.

The ratio of these two types of silver particles is chosen to minimize unwanted shrinkage (e.g., by choosing a larger amount of the coarse silver), while maximizing conductivity and strength (e.g., by choosing an increased amount of the finer silver). It has been found that the optimum ratio of coarse to fine silver is about 4:1. Good adhesives can be generated in ranges from about 6:1 to 3:1. So far as we can determine, these silver blends are novel per se.

Various conventional organic binders are available, such as isobutyl methacrylate, nitrocellulose, cellulose acetate butyrate, etc. A preferred organic binder is ethylcellulose. These materials are conventionally dissolved in a solvent for formulating the paste. The amount of binder (exclusive of solvent) is typically about 0.2-1.0 weight %, preferably about 0.35 weight %, based on the total weight of paste.

Various solvents may be used alone or in combination to generate the desired evaporation rates. Ester-alcohols, terpene-alcohols, dibasic esters and glycol-ethers and their acetates are particularly suitable for this application. These solvents have relatively high boiling points and, therefore, avoid unwanted room temperature volatility. Solvents are chosen for the combination of properties desired. Ester- and terpene-alcohols impart excellent strength and dispersibility. Dibasic esters and glycol ethers allow virtually void-free films upon drying. Typical solvent to suspend the solid particulates is in the range 9-24.8 weight %.

Conductive adhesive pastes of our invention have the following formulations:

(A) Glass powder of the invention, 11-23 weight %, preferably 15-19 weight %;
(B) Conductive metal particulates (preferably Ag), 56-77 weight %, preferably 65-70 weight %; and
(C) Organic (including solvent), 10-25 weight %, preferably 13-17 weight %.

Our preferred paste uses the powdered glass of Example No. 23, one part by weight; Ag particulates, four parts; and organic, one part, where the organic comprises ethylcellulose in an ester-alcohol solvent such as Texanol ® (manufactured by Eastman Kodak). The Ag is a 4:1 blend of the two particle sizes as above described.

The paste may be applied to a ceramic base, and then the second ceramic item to be attached such as an integrated circuit chip, may be applied to the paste before firing. In the typical and most convenient application the paste is applied to a ceramic base such as alumina, and then a second ceramic such as an integrated silicon circuit chip is applied to the paste, and the assembly is heated to about 100° C. above the glass $T_g$ point, whereupon a good bond results.

For example, bare-back silicon chips were attached to 96% alumina substrates using the paste of Example 23 at different temperatures. The results are set forth in Table IV.

TABLE IV

| Composition of Example No. 23 Die Shear Strength Test (a) | |
| --- | --- |
| Peak Firing Temperature (°C.) | Die Shear Strength (kg) |
| 380 | 18 |
| 390 | 26.5 |
| 405 | 38.5 |
| 430 | 38.75 |

(a) Using 300 × 300 mil bare-back silicon die on bare 96% alumina substrates.

The die shear strength test which is described in MIL STD 883 Method 2019.5 is essentially a measure of the shear force necessary to remove the die from the substrate to which it is adhered. A material would be considered accepted by the MIL specification if it had a die shear of 5 kg. Since the values achieved here are over 3 times the specification requirement as reflected in die shear strength values shown in Table IV, they are considered to be bonded excellently at temperatures less than 400° C.

Shear and pull strengths and ionic purity of a glass of this invention as compared with a typical prior art glass was conducted as follows.

Glass was manufactured using the preferred embodiment of U.S. Pat. No. 4,699,888 to Dumesnil et al. The glass composition was made from 5.44 g $PbF_2$, 0.90 g $SiO_2$, 2.18 g $Cu_2O$, 1.46 g $Bi_2O_2$, 5.44 ZnO, 1.18 g $Al_2O_3$, 8.16 g $B_2O_3$ and 75.24 g PbO. Although Dumesnil et al discloses adding powdered silver metal, there is no suggestion of the present composition using $Ag_2O$. Dumesnil et al employ an 8-component glass system utilizing $PbF_2$, $Cu_2O$ and $Bi_2O_3$ for lowering Tg. $Bi_2O_3$, as mentioned before, attacks the platinum crucible used for melting of high purity glasses. $PbF_2$, as will be seen below, renders the glass to be less stable with respect to attack by moisture. None of these components are present in our invention.

The $T_g$ measured 269° C. for the Dumesnil et al composition as compared to a glass from Example 23 of this application at 280° C. Although the $T_g$ of the prior art material was lower than that of the glass of this invention, its fluidity when fired at 395° C. for six minutes is less than that reported here as demonstrated by the following strength numbers achieved by substituting each glass into the formulation mentioned previously (i.e., glass 1 part, Ag 4 parts, and organic 1 part, where the organic comprises ethylcellulose in an ester-alcohol solvent):

TABLE V

|  | Dumesnil | This Invention (Example 23) |
|---|---|---|
| Die Shear* | 11 kg | 37 kg |
| Die Pull* | 3 lb | 50 lb |

*Using 0.300 × 0.300 inch bare backed silicon die on 96% alumina substrates.

The die shear test is according to MIL STD 883 Method 2019 and the die pull test is according to MIL STD 883 Method 2027.

Additionally, ionic purity was measured on these two adhesive pastes made with these glasses. Results were as follows:

TABLE VI

|  | Dumesnil | This Invention (Example 23) |
|---|---|---|
| F− | 53 ppm | 14 ppm |
| Cl− | 14 ppm | 11 ppm |
| Na+ | 15 ppm | 15 ppm |
| K+ | 6 ppm | 3 ppm |

Ionic purity is generally required in die attach adhesives as it is in most electronic devices. Residual moisture in the sealed package will combine with available Na and K ions which can short the circuiting on the chip. F and Cl ions when combined with moisture, form corrosives which also degrade the device. Consequently, the lower the value for the concentration of extractable ions shows that the composition of this invention is not only more resistant to water than the prior art, but also better in terms of long-term device reliability.

The substrate-paste-chip assembly is preferably heated in a two step process. First a drying step is used to drive off the organic components, then the firing step melts the glass and bonds the substrates. Broadly speaking, both steps are well known in the art. We differ in that our glasses permit a lower firing temperature while giving a bond of superior properties. The initial drying step (to drive off the organic) may be omitted under certain circumstances, for example, if the die size is 0.05 inches square or less. Also, for larger dies, drying can be incorporated into the firing cycle by slowing the heating rate.

Laminates may be made by additional layers of paste and ceramic.

Considerable variation in the $PbO-B_2O_3-Ag_2O$ composition of the glass is possible while retaining low $T_g$ and other desirable properties. Our work indicates that a $PbO-B_2O_3-Ag_2O$ weight range of 76-88:10-15:2-10 is operable, and preferably 80-88:10-10-12:2-10. Our examples used 25 g. batches. Obviously, any size batch can be made up, limited only by the size of the platinum crucible and the heat source. Melt times may range from a few minutes to several hours, depending on batch size, heat source, etc.

The invention glasses can be mixed with Ag (or any other conductive particulates) in a glass:conductive particulate weight range of 1:2.3-7.3, preferably 1:3-5.7.

With respect to substrates adherable by the glasses of this invention, alumina and silicon ceramics are especially suitable. Others include beryllia, steatite, silicon nitride, silicon carbide, gallium arsenide, etc.

The glasses of this invention are especially designed for adhesive function at about, or less than, 400° C., which temperature is sufficiently low to prevent degradation of most integrated circuit chips and Ni migration and oxidation. Obviously, if chips are being adhered where such degradation is not a problem, higher temperatures can be used, e.g., up to about 450° C.

In our examples we used Ag as the conductive matrix. However, our invention is not limited to Ag; substantially any of the conductive particulates conventionally used in the die adhesive art are useful, such as gold, platinum, or any of the air-fired metals. Nickel may be used with care at low temperatures.

It is understood that the foregoing detailed description is given merely by way of illustration and that many variations may be made therein without departing from the spirit of this invention.

What is claimed is:

1. A homogeneous composition suitable for use in forming a conductive adhesive comprising
   a powdered glass composition having a glass transformation temperature below about 300° C., comprising $PbO$, $B_2O_3$, and $Ag_2O$ in a respective weight ratio of 76-88:10-15:2-10 and
   conductive particulates present in an electrically conductive effective amount.

2. A homogeneous composition according to claim 1 comprising said powdered glass having a particle size which passes through a 200 U.S. mesh screen, but being not less than about 2 microns and Ag particulates, in a glass:Ag weight ratio of about 1:2.3-7.3.

3. A homogeneous composition according to claim 2, wherein the ratio is about 1:3-5.7.

4. A homogeneous composition according to claim 1 comprising said powdered glass and Ag particles, in a glass:Ag weight ratio of 1:3-5.7; said Ag particles consisting essentially of a mixture of components A and B;
   component A being Ag particles having an average size of about 9 microns, with about 90 weight % less than 15 microns and about 10% less than 4 microns;
   component B being Ag particles having an average size of about 3.5 microns, with about 90 weight % less than 11 microns and about 10 weight % less than 0.7 micron; and
   the weight ratio of components A:B is about 3-6:1.

5. A conductive adhesive composition according to claim 4, wherein the glass:Ag weight ratio is 1:4; and the ratio of components A:B is about 4:1.

6. A composition comprising the composition of claim 1 and further comprising an organic binder so as to form a paste composition.

7. A composition comprising the composition of claim 2 and further comprising an organic binder so as to form a paste composition.

8. A composition comprising the composition of claim 3 and further comprising an organic binder so as to form a paste composition.

9. A composition comprising the composition of claim 4 and further comprising an organic binder so as to form a paste composition.

10. A composition comprising the composition of claim 5 and further comprising an organic binder so as to form a paste composition.

11. An electrically conductive paste composition comprising
   (A) 11-23 weight % powdered glass, said glass comprising PbO, $B_2O_3$, and $Ag_2O$ in a respective weight ratio of 76-88:10-15:2-10;
   (B) 56-77 weight % conductive metal particulates;
   (C) 10-25 weight % organic, including solvent.

12. A paste composition according to claim 11, wherein:
   (A) is 15-19 weight %;
   (B) is 65-70 weight %; and
   (C) is 13-17 weight %.

13. A paste composition according to claim 12, wherein (B) is Ag consisting of a homogeneous blend of (I) Ag particles having an average size of about 9 microns, with about 90 weight % less than 15 microns and then about 10% less than 4 microns, and (II) Ag particles having an average size of about 3.5 microns, with about 90 weight % less than 11 microns and about 10 weight % less than 0.7 microns; the weight ratio of I:II being about 3-6:1.

14. A paste composition according to claim 13, wherein I:II is about 4:1.

15. A homogeneous composition according to claim 4, where said glass consisting essentially of, in weight %, PbO 83.71%; $B_2O_3$ 11.45%; $Al_2O_3$ 0.29%; ZnO 1.88%; and $Ag_2O$ 2.67% and having a particle size which passes through a 200 U.S. mesh screen, but being not less than about 2 microns.

* * * * *